United States Patent
Cheng et al.

(10) Patent No.: US 12,256,870 B2
(45) Date of Patent: Mar. 25, 2025

(54) UTENSIL CROCK

(71) Applicant: Helen of Troy Limited, St. Michael (BB)

(72) Inventors: Carly Cheng, New York, NY (US); Kristopher Blake Wagner, New York, NY (US); Martin Mutch, Bend, OR (US)

(73) Assignee: HELEN OF TROY LIMITED, St. Michael (BB)

( * ) Notice: Subject to any disclaimer, the term of this patent is extended or adjusted under 35 U.S.C. 154(b) by 180 days.

(21) Appl. No.: 17/902,198

(22) Filed: Sep. 2, 2022

(65) Prior Publication Data

US 2024/0074621 A1 Mar. 7, 2024

(51) Int. Cl.
*A47J 47/16* (2006.01)
*B65D 25/06* (2006.01)

(52) U.S. Cl.
CPC ............. *A47J 47/16* (2013.01); *B65D 25/06* (2013.01)

(58) Field of Classification Search
CPC ......... A47J 47/16; B65D 25/06; B65D 25/04; A47B 57/00; A47B 65/15; A47B 88/975; A47B 96/04
USPC .......................... 220/529, 530, 531, 532, 533
See application file for complete search history.

(56) References Cited

U.S. PATENT DOCUMENTS

| | | | |
|---|---|---|---|
| RE32,740 E * | 8/1988 | Steffes | A45C 11/20 312/351 |
| 4,964,528 A * | 10/1990 | Wagoner | F25D 23/069 62/457.2 |
| 5,433,336 A * | 7/1995 | Kristoffersson | A47B 88/90 220/531 |
| 6,439,403 B1 | 8/2002 | Levsen | |
| 7,121,415 B1 | 10/2006 | Vizcarra | |
| 7,588,153 B2 | 9/2009 | Yang et al. | |
| D833,699 S | 11/2018 | Serrahima | |
| D886,548 S | 6/2020 | Evans | |
| 2008/0054003 A1* | 3/2008 | Curtin | A47J 47/10 220/571 |
| 2015/0238032 A1 | 8/2015 | Parks | |
| 2016/0059990 A1* | 3/2016 | Patikas-Bryant | B65D 21/086 220/523 |
| 2018/0065782 A1* | 3/2018 | Liu | B65D 85/34 |

* cited by examiner

*Primary Examiner* — Don M Anderson
*Assistant Examiner* — Laura E. Parker
(74) *Attorney, Agent, or Firm* — RANKIN, HILL & CLARK LLP

(57) ABSTRACT

A utensil crock includes a receptacle having a base and a sidewall defining an open upper end of the receptacle. A dividing panel IS adapted to be removably positioned within an interior of the receptacle to divide the interior into separate compartments. The dividing panel has a first end portion opposite a second end portion, wherein when positioned in the interior the dividing panel has one of a first configuration where the second end portion has a first orientation relative to the first end portion, and a second configuration where the second end portion has a differing second orientation relative to the first end portion.

15 Claims, 11 Drawing Sheets

US 12,256,870 B2

UTENSIL CROCK

BACKGROUND

Kitchen utensils have various shapes and sizes and many such utensils do not fit within conventional horizontal drawers. Some utensils, such as spatulas, whisks, wooden spoons and the like, are too wide to fit within a horizontal drawer, or consume too much space therein. Further, horizontal drawers and other typical storage spaces are not adjustable in size and cannot be made to accommodate larger utensils. Therefore, these types of kitchen utensils are typically stored in an upright position within a larger storage container or crock. However, when multiple utensils are disposed in a crock having a single compartment, the utensils can be entangled with one another and may be difficult to separate. Further, the utensils may not be well organized, and as a result the user may have difficulty quickly locating and accessing a particular utensil. Accordingly, it is known to provide a kitchen utensil crock adapted to store utensils of various sizes in an upright orientation, wherein the crock includes dividing panels that can be removably inserted into the interior volume in order to define compartments of a particular size. In this way, the user can adjust the kitchen utensil crock to suit his or her needs. However, utensil crocks of this type include dividing panels having a fixed configuration and can be oversized with no means for storing the individual dividing panels when not in use.

BRIEF DESCRIPTION

In accordance with one aspect, a utensil crock comprises a receptacle having a base and a sidewall defining an open upper end of the receptacle. A dividing panel is adapted to be removably positioned within an interior of the receptacle to divide the interior into separate compartments. The dividing panel has a first end portion opposite a second end portion. The dividing panel is configurable between a first configuration where the second end portion has a first orientation relative to the first end portion and a second configuration where the second end portion has a differing second orientation relative to the first end portion, and when positioned in the interior the dividing panel has one of the first configuration and the second configuration.

In accordance with another aspect, a utensil crock comprises a receptacle having a base and a sidewall defining an open upper end of the receptacle. An inner surface of the sidewall includes a first channel and a second channel aligned with and facing the first channel. A dividing panel IS removably positioned within the first and second channels of the receptacle to separate an interior of the receptacle into compartments. The dividing panel includes a first panel part and a second panel part that is movable relative to the first panel part such that the dividing panel when positioned within the first and second channels has one of a first configuration where the first and second panel parts are vertically aligned and a second configuration where the second panel part is extended outwardly from the first panel part toward the sidewall and defines a bottom surface for one of the compartments.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or feature's relationship to another element(s) and/or feature(s) as, for example, illustrated in the figures. It will be understood that the spatially relative terms are intended to encompass different orientations of the utensil crock in addition to the orientation depicted in the figures. Moreover, any term of degree used herein, such as "substantially" and "approximately", means a reasonable amount of deviation of the modified word is contemplated such that the end result is not significantly changed.

Figure 1:
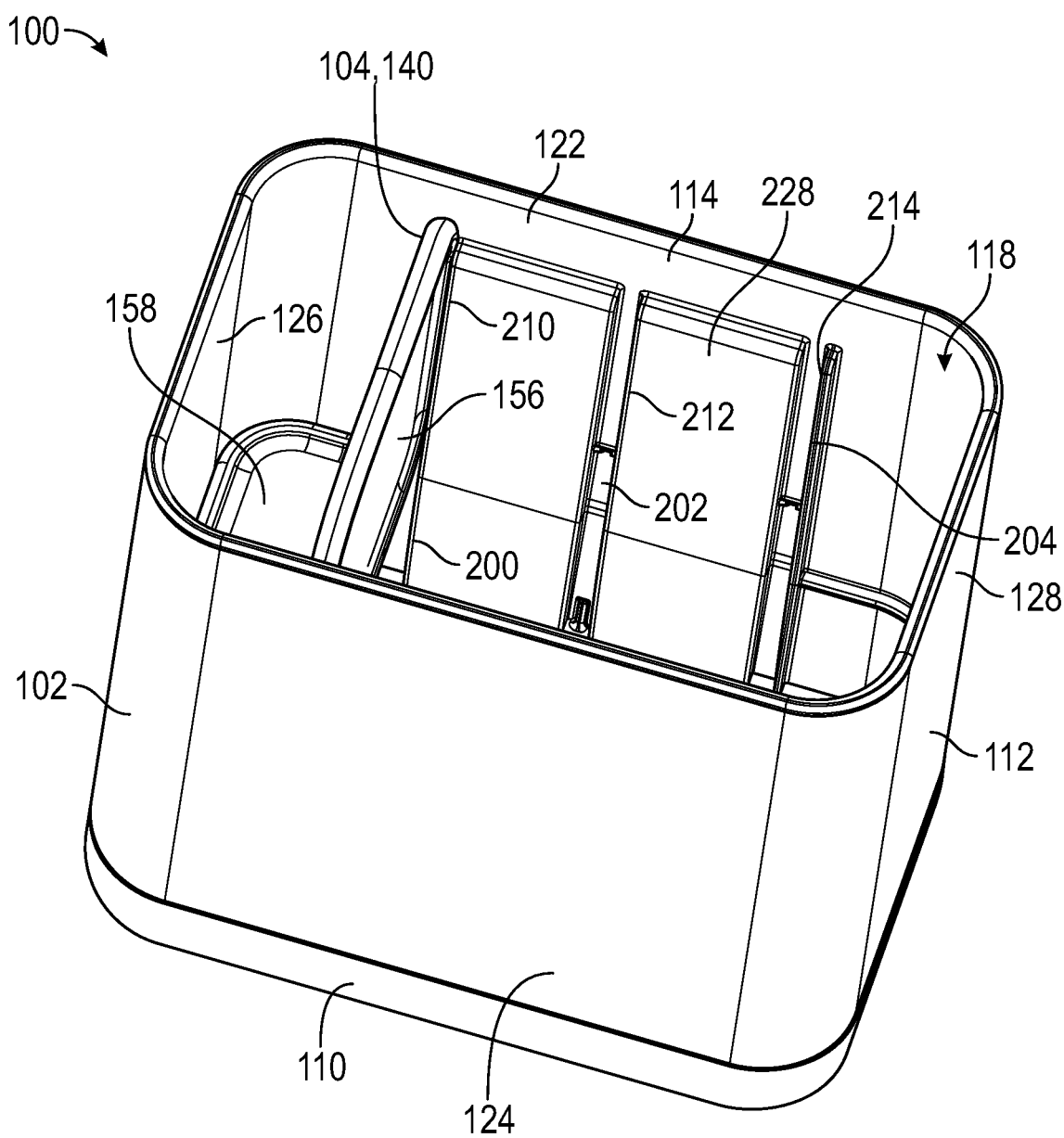
FIG. 1 is a perspective view of a utensil crock according to one aspect of the present disclosure, wherein the utensil crock includes a receptacle and a first dividing panel removably positioned within the receptacle.
Figure 2:
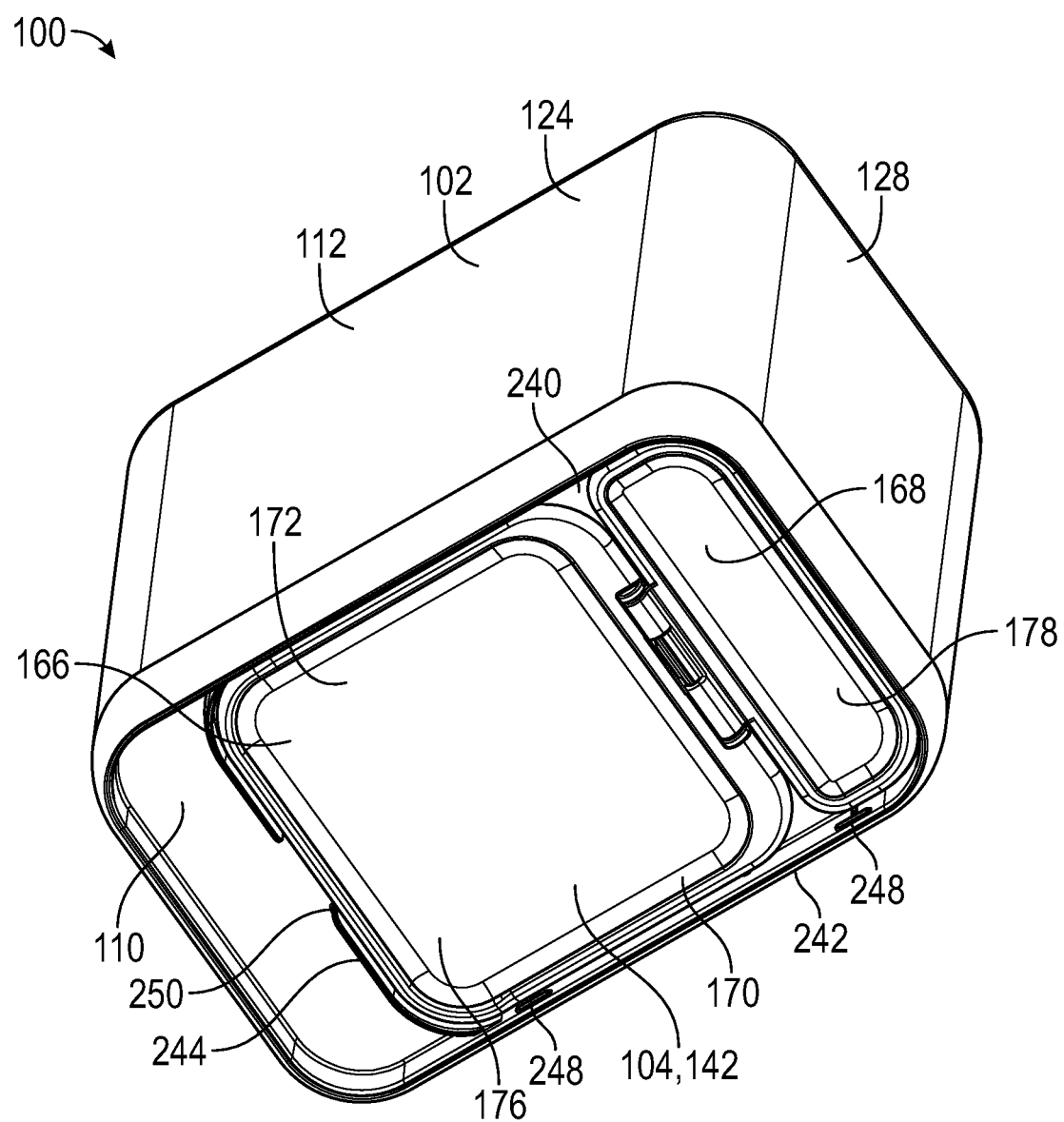
FIG. 2 is a perspective view of the utensil crock of FIG. 1 with a second dividing panel stored within a base of the receptacle.
Figure 3:
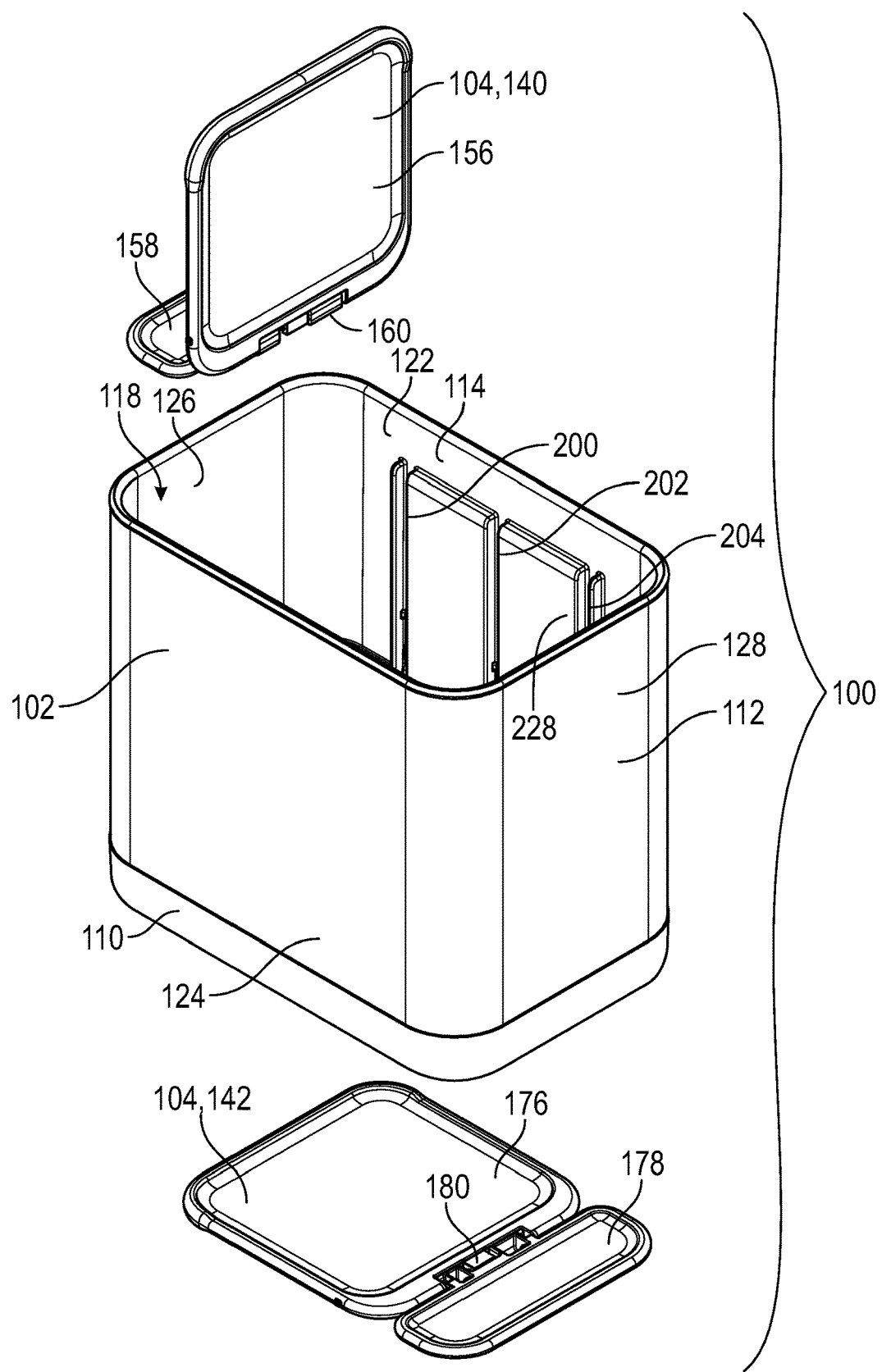
FIG. 3 is an exploded perspective view of FIG. 1.

Referring now to the drawings, wherein like numerals refer to like parts throughout the several views, FIGS. 1-3 illustrate a utensil crock 100 according to one aspect of the present disclosure. The utensil crock 100 includes a receptacle 102 and at least one removable divider or dividing panel 104 associated with the receptacle. The receptacle 102 includes a base 110 and a sidewall 112 which defines an open upper end 114 of the receptacle 102. The base and sidewall together define an interior 118 of the receptacle 102 which, as will be described below, can be separated into compartments via the at least one dividing panel 104. In the depicted embodiment, the sidewall 112 is substantially rectangular shaped and includes a first side 122 opposite a second side 124 and a first end 126 opposite a second end 128. Although, it should be appreciated that alternative shapes for the receptacle are contemplated. The base 110 can be a part separate from the sidewall 112, and can be mechanically attached to the sidewall.

Figure 4:
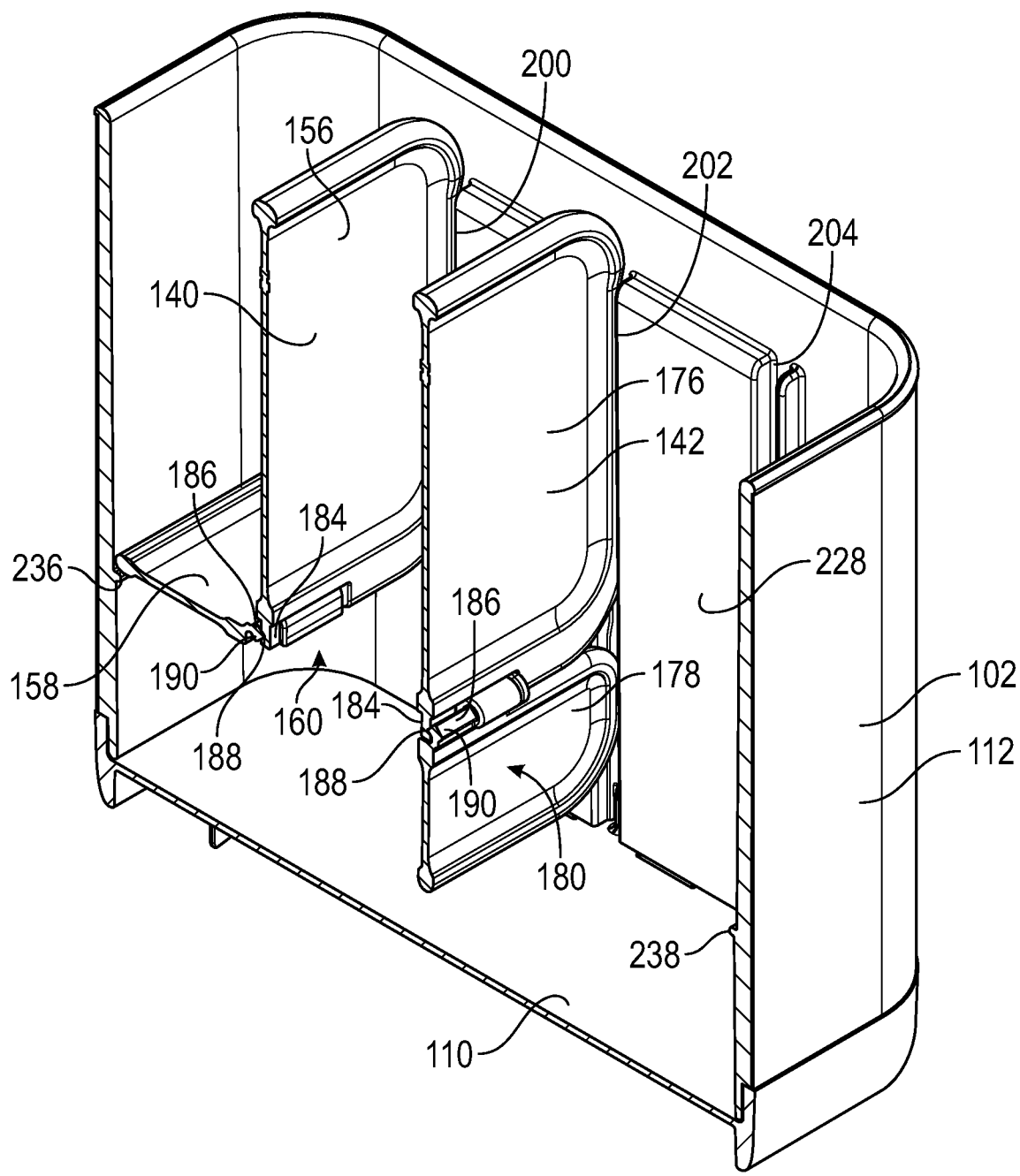
FIG. 4 is a cross-sectional view of the utensil crock with both the first dividing panel and the second dividing panel positioned within the receptacle.
Figure 5A:
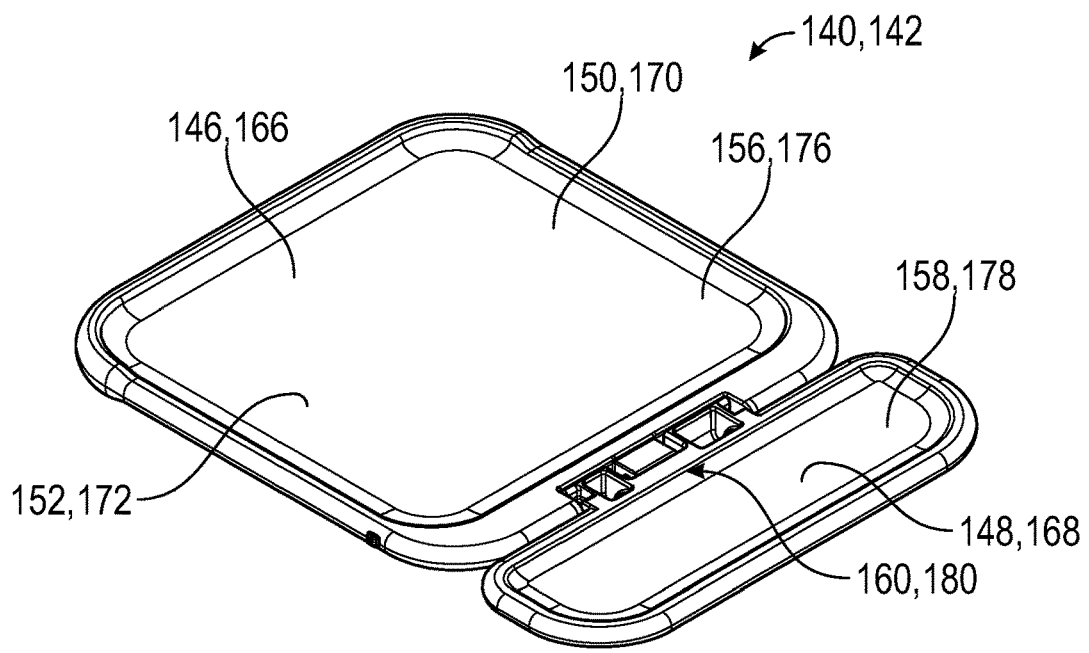
FIG. 5A and FIG. 5B are perspective views showing the dividing panels in first and second configurations.

The at least one dividing panel 104 is adapted to be removably positioned within the interior 118 of the receptacle 102 to divide the interior into separate compartments (FIG. 1), and the base 110 of the receptacle 102 is adapted to store the at least one dividing panel 104 when not in use within the interior 118 (FIG. 2). According to the depicted aspect, the at least one dividing panel 104 includes a first dividing panel 140 and, optionally, a second dividing panel 142. In FIGS. 4 and 5, the first dividing panel 140 includes a first end portion 146 opposite a second end portion 148 and a first side portion 150 opposite a second side portion 152.

The first dividing panel 140 is configurable between a first configuration where the second end portion 148 has a first orientation relative to the first end portion 146 and a second configuration where the second end portion 148 has a differing second orientation relative to the first end portion 146. When positioned in the interior 118 the first dividing panel 140 has one of the first configuration and the second configuration. More particularly, the first dividing panel 140 includes a first panel part 156 having the first end portion 146 and a second panel part 158 having the second end portion 148 that is movable relative to the first panel part allowing the first dividing panel 140 to be positioned in one of the first configuration and the second configuration. As shown, the first panel part 156 and the second panel part 158 are separate components of the first dividing panel 140, wherein the second panel part is pivotally connected to the first panel part via a hinged connection 160.

The second dividing panel 142 for use with the utensil crock 100 is constructed similar to the first dividing panel 140. Accordingly, in FIGS. 4, 5A and 5B, the second dividing panel 142 includes a first end portion 166 opposite a second end portion 168 and a first side portion 170 opposite a second side portion 172. When positioned in the interior 118 the second dividing panel 142 also has one of a first configuration where the second end portion 168 has a first orientation relative to the first end portion 166, and a second configuration where the second end portion 168 has a differing second orientation relative to the first end portion 166. More particularly, the second dividing panel 142 includes a first panel part 176 having the first end portion 166 and a second panel part 178 having the second end portion 168 that is movable relative to the first panel part allowing the second dividing panel 142 to be positioned in one of the first configuration and the second configuration. Again, the first panel part 176 and the second panel part 178 are separate components of the second dividing panel 142, wherein the second panel part is pivotally connected to the first panel part via a hinged connection 180.

In the first configuration (FIG. 5A), the first panel part 156, 176 and second panel part 158, 178 of each of the first and second dividing panels 140, 142 are vertically aligned within the interior 118 of the receptacle 102. In the second configuration (FIG. 5B), the second panel part 158, 178 of each of the first and second dividing panels 140, 142 is approximately perpendicular to the first panel part 156, 176. FIG. 4 shows an example of the first and second dividing panels 140, 142 within the receptacle 102 to define separate compartments within the interior 118. The first dividing panel 140 is in the second configuration, where the second panel part 158 defines a bottom surface for one of the separate compartments of the interior 118 provided by the dividing panels 140, 142 that is vertically spaced and approximately parallel to the base 110, thereby providing compartments of differing depths within the receptacle 102. The second dividing panel 142 is in the first configuration.

As indicated, the first panel part 156, 176 and the second panel part 158, 178 of each of the first and second dividing panels 140, 142 are pivotally connected via the hinged connection 160, 180. According to the present disclosure, the hinged connection 160, 180 is adapted to maintain the orientation of the second panel part relative to the first panel part. To this end, as shown in FIG. 4, each hinged connection 160, 180 includes a first retaining member 184 provided on one of the first and second panel parts and a second retaining member 186 provided on the other of the first and second panel parts for engaging the first retaining member. By way of example, the first retaining member 184 extends from the first panel part 156, 176 and includes a notch or channel 188. The second retaining member 186 extends from the second panel part 158, 178 and includes a rod or bar 190 having a substantially rectangular shape in cross-section. This shape of the bar 190 received within the channel 188 prevents rotational movement of the second panel part 158, 178 relative to the first panel part 156, 176 without a force applied to the second panel part 158, 178. It should be appreciated that alternative configurations for the first and second retaining members 184, 186 are contemplated without departing from the present disclosure.

Figure 5B:
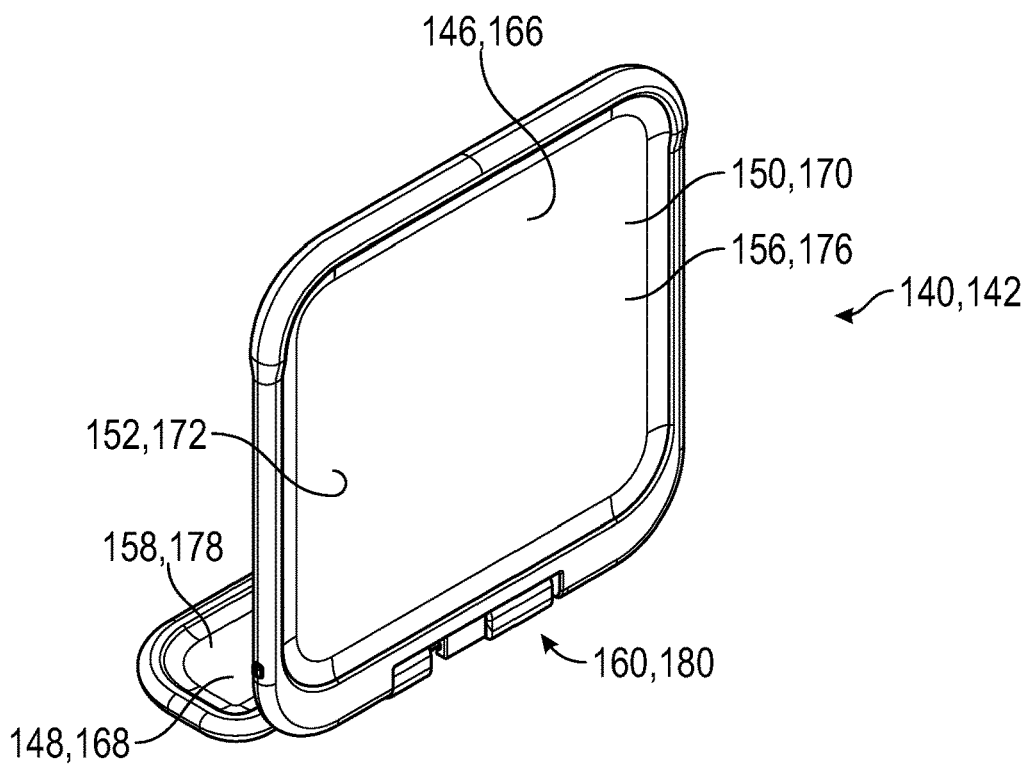
Figure 6:
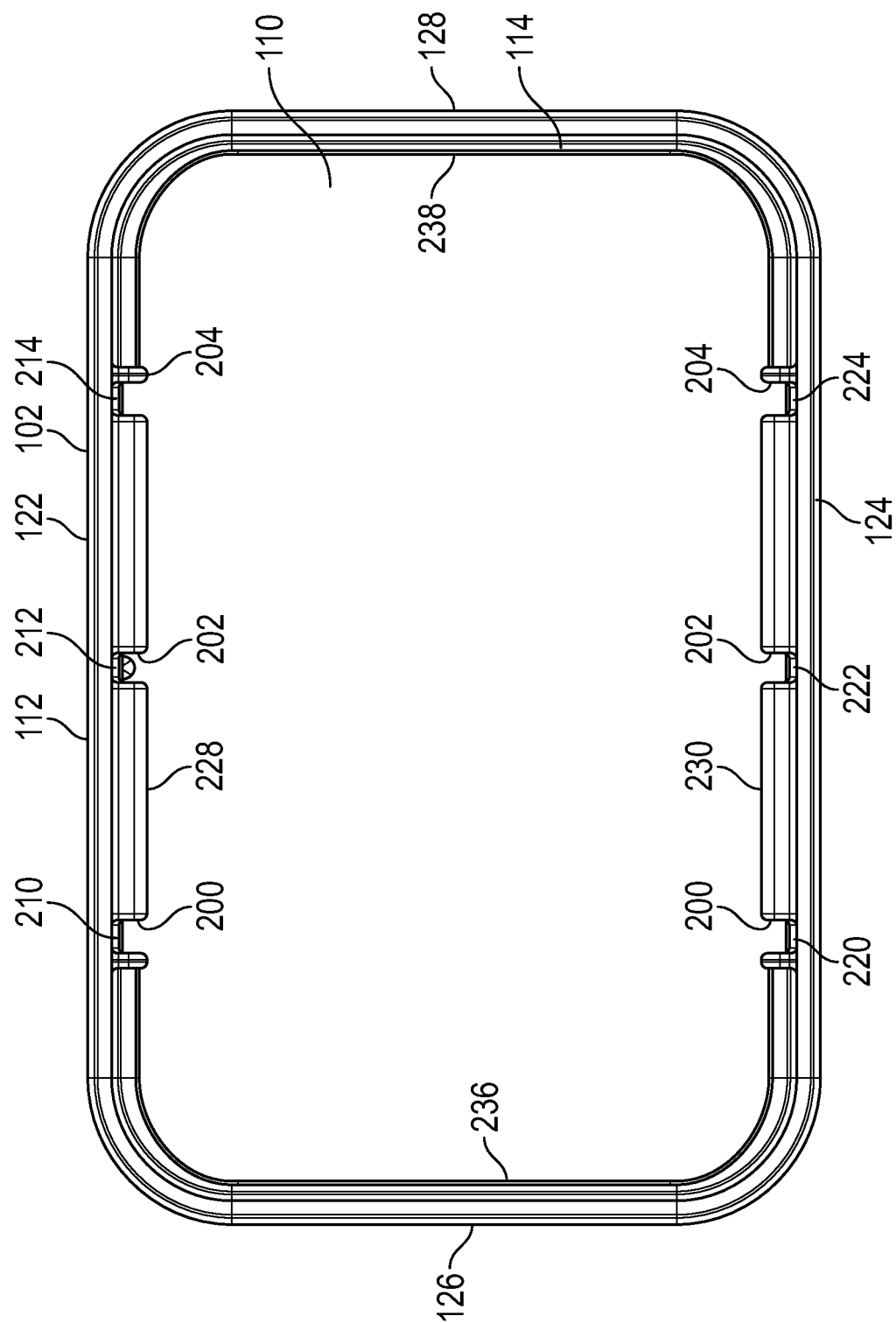
FIG. 6 is a top plan view of the receptacle of FIG. 1.

With reference to FIGS. 1, 3, 4 and 6, to releasably secure the at least one dividing panel (i.e., at least one of the first and second diving panels 140, 142) in the interior 118 of the receptacle 102, the interior surface of the sidewall 112 is provided with at least one guide 200 adapted to slidingly receive the at least one dividing panel 104. Specifically, the at least one guide includes at least first and second guides 200, 202 for selectively receiving one the first dividing panel 140 and the second dividing panel 142. In the depicted aspect, the at least one guide further includes a third guide 204; although, this is not required, noting that the utensil crock 100 can be provided with only the first and second guides spaced at various locations along the interior surface of the sidewall 112. As shown, each of the illustrated guides is formed by channels provided on the inner surface of the sidewall 112 of the receptacle. Particularly, in FIG. 6, for each respective guide 200, 202, 204, the first side 122 includes a first channel 210, 212, 214 and the second side includes a second channel 220, 222, 224 aligned with and facing the corresponding first channel. Each of the first channel and the second channel of each respective guide 200, 202, 204 extends vertically between the base 110 and the open upper end 114 of the sidewall 112 and is adapted to receive one of the first dividing panel 140 and the second dividing panel 142 in either the first configuration (FIG. 5A) or the second configuration (FIG. 5B). To accommodate the first and second channels, first and second side panels 228, 230 can be provided on the respective first and second sides 122, 124. Again, each of the first and second dividing panels 140, 142 has the first side portion 150, 170 and the second side portion 152, 172, and the first and second side portions of the first and second dividing panels are adapted to be inserted into the first channel and the second channel of each guide 200, 202, 204 in both the first configuration and the second configuration of the dividing panel. This allows the user to selectively insert the first and second dividing panels 140, 142 in either configuration of FIGS. 5A and 5B into the interior 118 of the receptacle, thereby dividing the interior into separate compartments for their selective use.

As indicated, the hinged connection 160, 180 for each of the first and second dividing panels 140, 142 is adapted to maintain the dividing panel in the first or second configuration. According to the present disclosure, at least one of the first end 126 and the second end 128 of the sidewall 112 is also adapted to support at least one of the first and second dividing panels 140, 142 in the second configuration. With the selected dividing panel 140, 142 in the second configuration (FIG. 5B), and then inserted into the first guide 200 or the third guide 204 (i.e., the guides located near the first and second end 126, 128), the second end portion 148, 168 of the selected dividing panel 140, 142 is supported on, for example, a ledge 236, 238 provided on the one of the first end and the second end of the sidewall. In the depicted aspect of FIG. 6, the ledge 236 extends on the inner surface of the sidewall 112 from the first panel 228, along the first end 126, to the second panel 230. Similarly, the ledge 238 extends on the inner surface of the sidewall 112 from the first panel 228, along the second end 128, to the second panel 230. With this arrangement, the first and second ledges 236, 238 can support an underside of each of the second panel parts 158, 178 of the selected first and second dividing panel 140, 142 in the second configuration when slid into the selective guide 200, 204.

Figure 7:
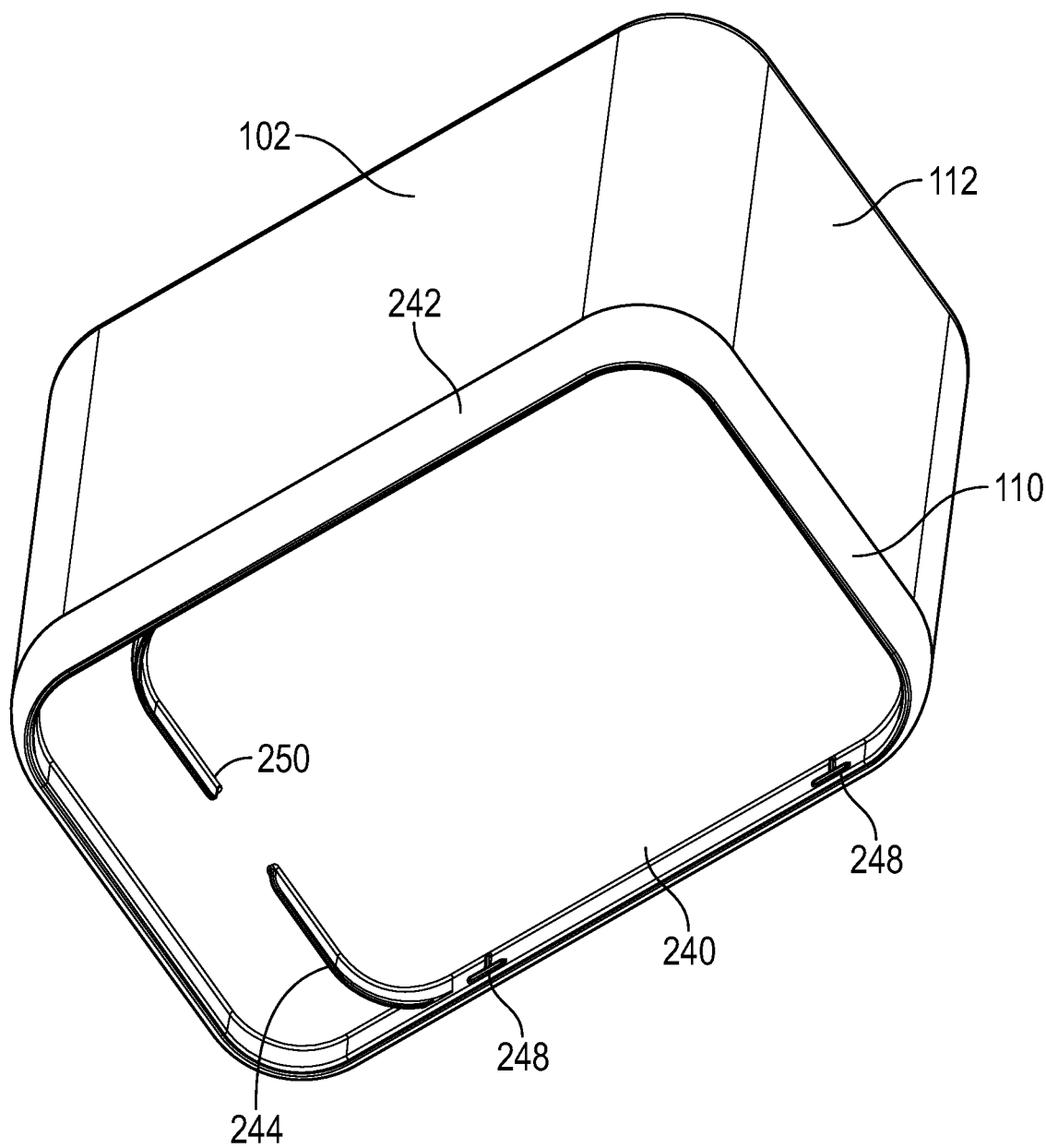
FIG. 7 is a perspective view of FIG. 2 without the stored second dividing panel.
Figure 8:
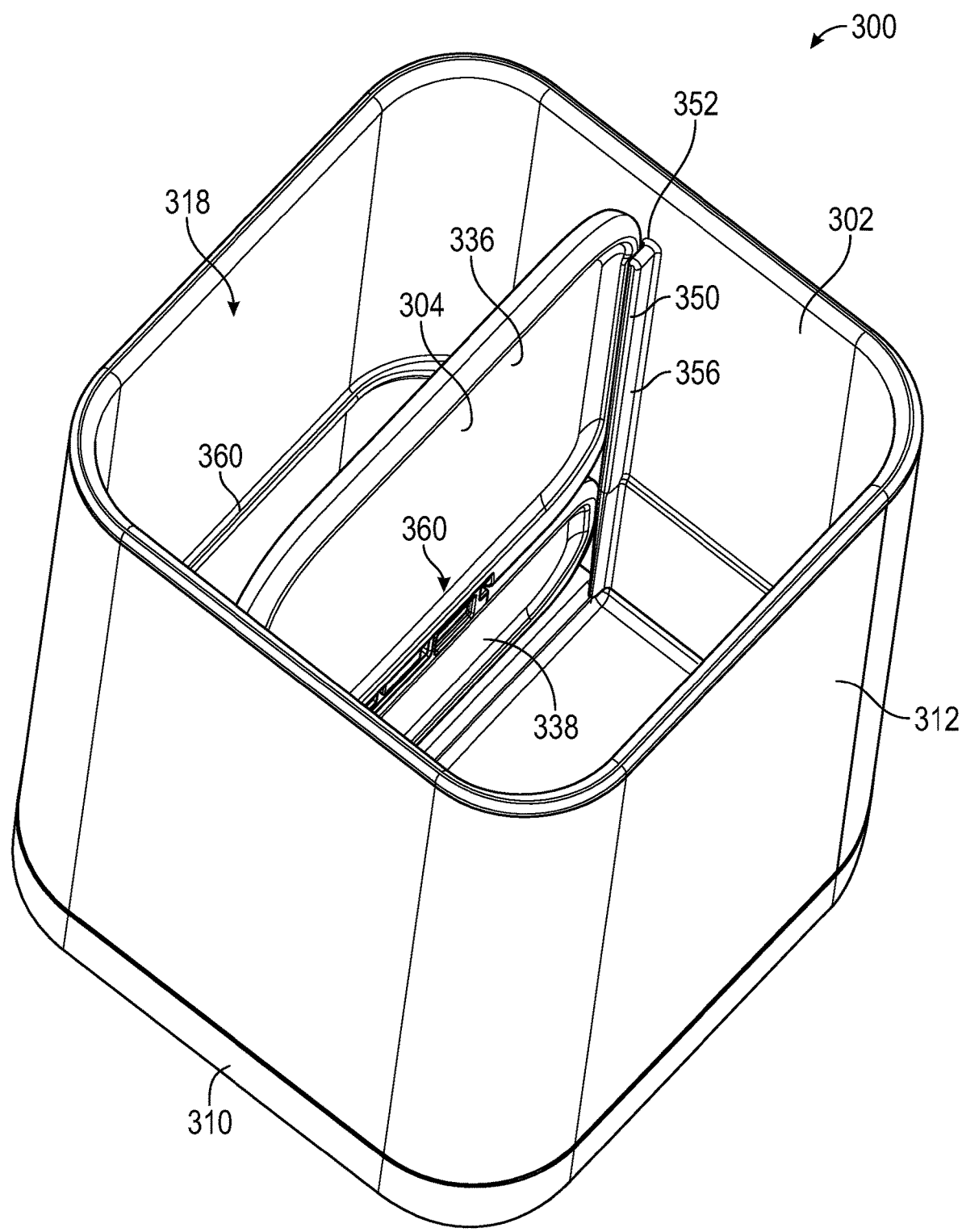
FIG. 8 is a perspective view of a utensil crock according to another aspect of the present disclosure, wherein the utensil crock includes a receptacle and a dividing panel removably positioned within the receptacle.
Figure 9:
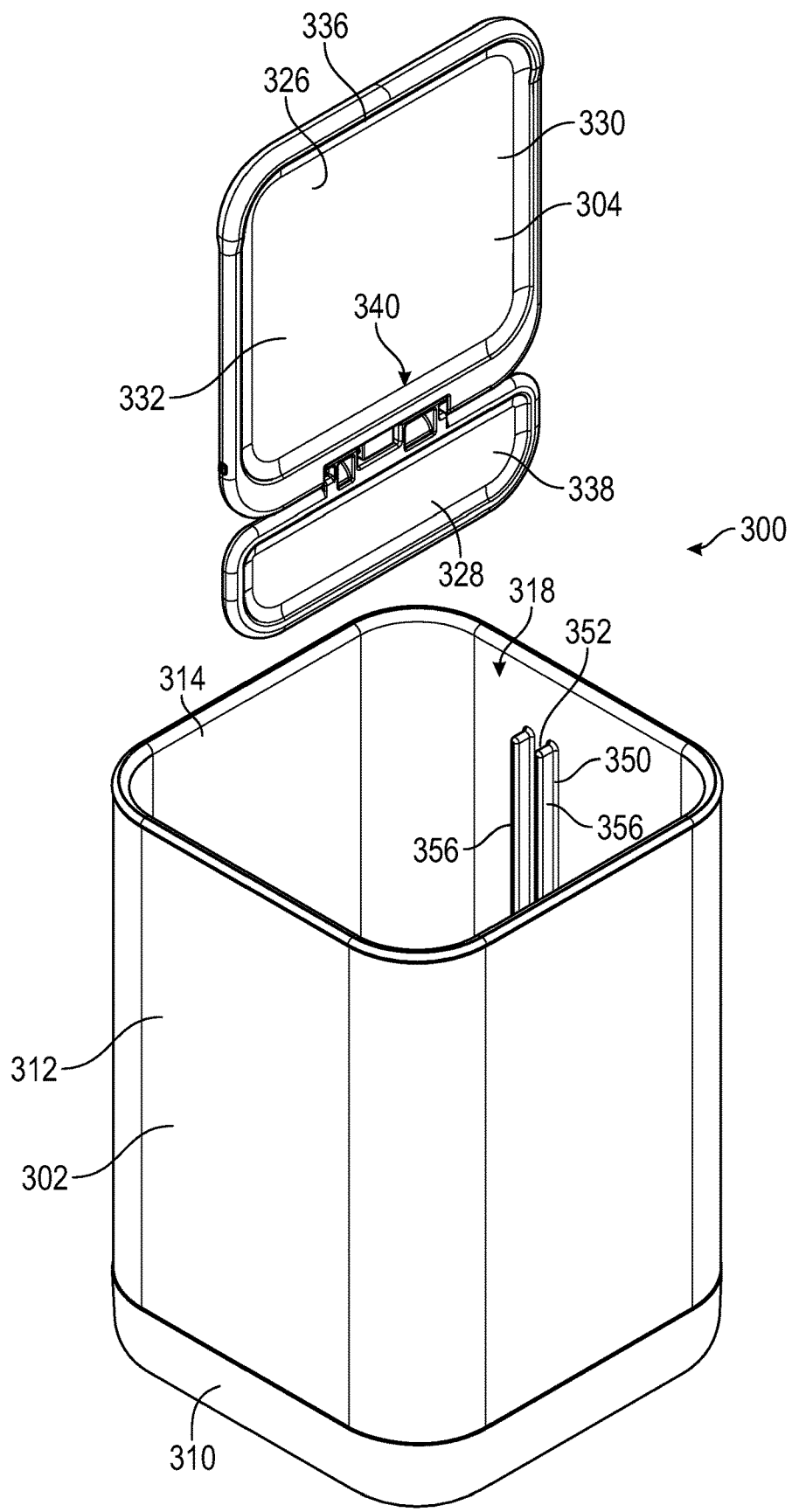
FIG. 9 is an exploded perspective view of FIG. 8.

According to the present embodiment of the utensil crock 100, the base 110 is adapted to store one of the first and second the dividing panels 140, 142 when not in use within the receptacle 102. With reference to FIGS. 2 and 7, the base 110 includes an outer recessed portion 240 sized to receive one of the first and second the dividing panels 140, 142 in the first configuration. The outer recessed portion is defined by a sidewall 242 of the base 110 and an inner wall 244. An inner surface of the sidewall 242 is provided with engagement members 248 adapted to engage the first and second side portions (e.g., the first and second side portions 170, 172 of the second dividing panel 142 shown in FIG. 2) to secure the one dividing panel within the recessed portion 240. The first and second end portions of the one dividing panel 140, 142 (e.g., the first and second end portions 166, 168 of the second dividing panel 142 shown in FIG. 2) are fitted between the sidewall 242 and the inner wall 244. Therefore, because the hinged connection can maintain the one dividing panel in the first configuration, the recessed portion 240 defined by the underside of the base 110 can securely store the one dividing panel without impacting the interior 118 of the receptacle 102. Further, the inner wall 244 can be provided with a cutout 250 to allow the user to easily remove the stored dividing panel from the recessed portion 240.

As is evident from the foregoing, the exemplary utensil crock 100 includes at least one removable dividing panel 104 which is slidably received in one of the guides 200, 202, 204 on the inner surface of the receptacle sidewall 112. The at least one dividing panel 104 includes the first panel part and the second panel part that is movable relative to the first panel part. This allows for different compartment configurations within the interior of the receptacle. For example, in FIG. 4 the at least one dividing panel 140 can be placed in vertically with the first and second panel parts aligned to create compartments of approximately equal depths, and alternatively can be placed in an L-shape with the second panel part extended outwardly (i.e., approximately perpendicular) from the first panel part to create compartments of differing depths. The at least one dividing panel 104 is completely removable if the user wants to leave the receptacle fully open, and when the at least one dividing panel 104 is removed it can be snapped onto the base 110 of the receptacle 102 where it lies flush with the base exterior surface to be fully out of view.

FIGS. 8-11 illustrate a utensil crock 300 according to another aspect of the present disclosure. The utensil crock 300 includes a receptacle 302 and a removable divider or dividing panel 304 associated with the receptacle. The receptacle 302 includes a base 310 and a sidewall 312 which defines an open upper end 314 of the receptacle 302. The base and sidewall together define an interior 318 of the receptacle 302 which, similar to the utensil crock 100 described above, can be separated into compartments via the dividing panel 304.

Figure 10:
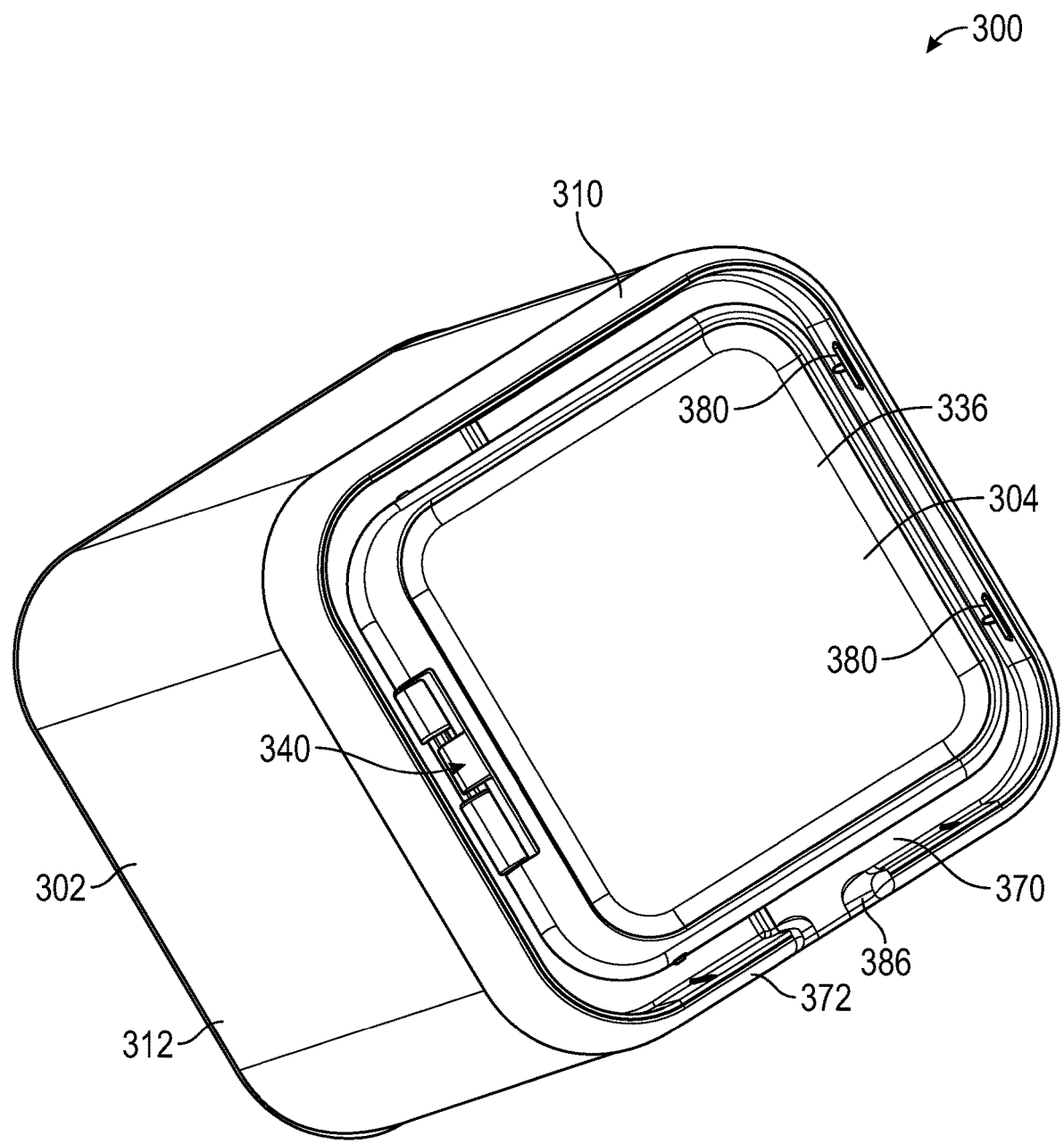
FIG. 10 is a perspective view of the utensil crock of FIG. 8 with the dividing panel stored within a base of the receptacle.

The dividing panel 304 is adapted to be removably positioned within the interior 318 of the receptacle 302 to divide the interior into separate compartments (FIG. 8), and the base 310 of the receptacle 302 is adapted to store the dividing panel 304 when not in use within the interior 318 (FIG. 10). Similar to the dividing panel 104, the dividing panel 304 includes a first end portion 326 opposite a second end portion 328 and a first side portion 330 opposite a second side portion 332. The dividing panel 304 is configurable between a first configuration where the second end portion 328 has a first orientation relative to the first end portion 326 and a second configuration where the second end portion 328 has a differing second orientation relative to the first end portion 326. When positioned in the interior 318 the dividing panel 304 has one of the first configuration and the second configuration. More particularly, the dividing panel 304 includes a first panel part 336 having the first end portion 326 and a second panel part 338 having the second end portion 328 that is movable relative to the first panel part allowing the dividing panel 304 to be positioned in one of the first configuration and the second configuration. Again, the first panel part 336 and the second panel part 338 are separate components connected via a hinged connection 340.

To releasably secure the dividing panel 304 in the interior 318 of the receptacle 302, the interior surface of the sidewall 312 is provided with a guide 350 adapted to slidingly receive the dividing panel 304. The guide 350 is defined by first and second aligned and facing channels provided on the inner surface of the sidewall 112 of the receptacle (only first channel 352 is visible). Each of the first and second channels can be defined by a pair of spaced elongated ribs 356. Each of the first channel and the second channel extends vertically between the base 310 and the open upper end 314 of the sidewall 312 and is adapted to receive the dividing panel 304 in either the first configuration or the second configuration.

Similar to the hinged connections 160, 180, the hinged connection 340 is adapted to maintain the orientation of the second panel part 338 relative to the first panel part 336. According to the present disclosure, the sidewall 312 is also adapted to support the dividing panel 304 in the second configuration. With the dividing panel 304 in the second configuration, and then inserted into the guide 350, the second end portion 328 of the dividing panel 304 (i.e., the second panel part 338) is supported on, for example, a ledge 360 provided on the interior surface the sidewall 312.

Figure 11:
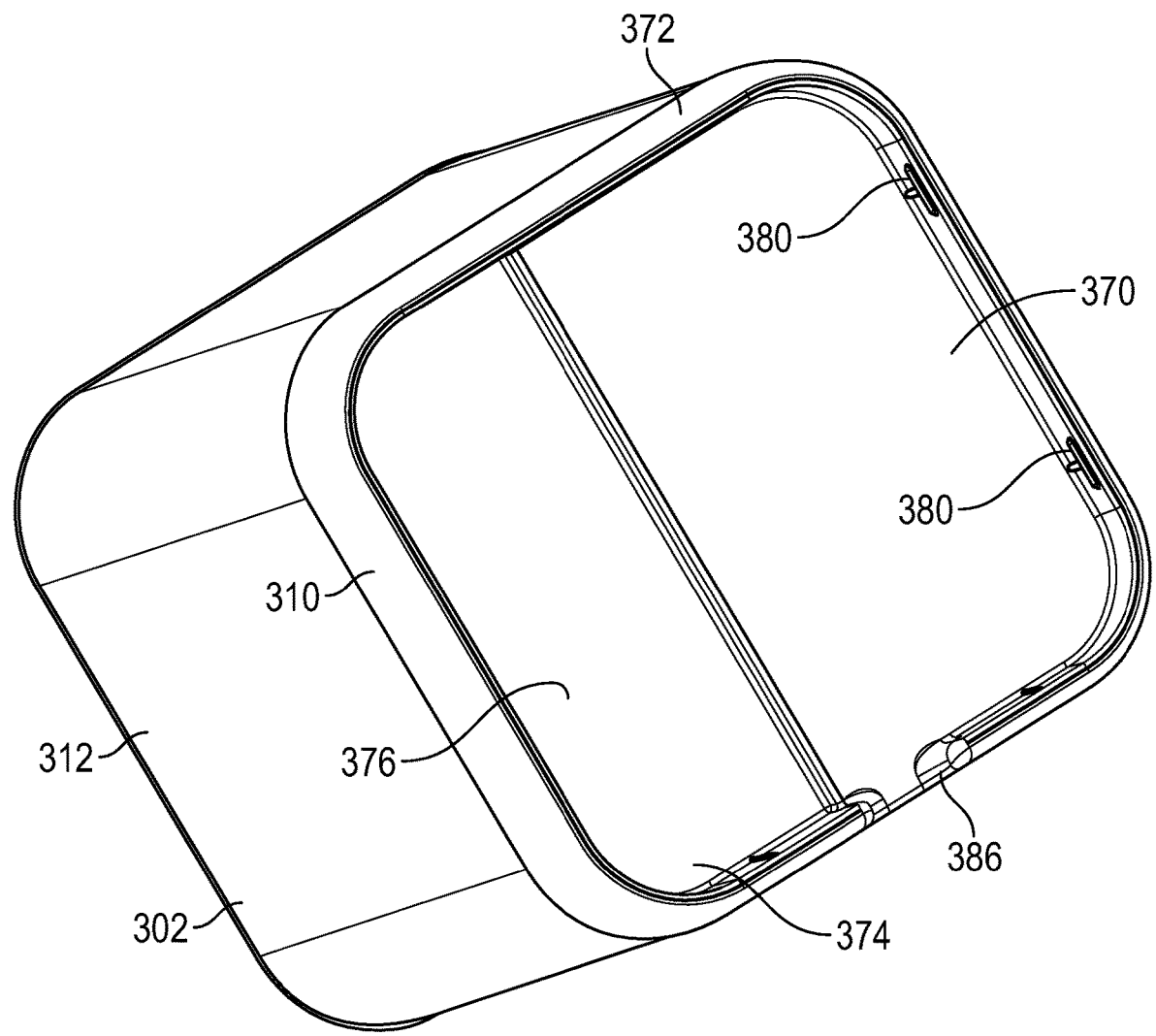
FIG. 11 is a perspective view of FIG. 8.

Similar to the utensil crock 100, the base 310 of the utensil crock 300 is adapted to store the dividing panel 304 when not in use within the receptacle 302. With reference to FIGS. 10 and 11, the base 310 includes an outer recessed portion 370 sized to receive the dividing panel 304 in a folded configuration where the second panel part 338 is folded over the first panel part 336. The outer recessed portion is defined by a sidewall 372 and bottom surface 374 of the base 310. Because the dividing panel 304 is stored in the folded configuration, the bottom surface 374 is stepped shaped to define a bottom section 376 of an increased depth to accommodate a thickness of both the first and second panel parts 336, 338 while allowing the dividing panel 304 in the folded configuration to lie flush with the base exterior surface to be fully out of view. An inner surface of the sidewall 372 is provided with engagement members 380 adapted to engage and secure the dividing panel 304 within the recessed portion 370. Further, the sidewall 372 can be provided with a cutout 386 to allow the user to easily remove the stored dividing panel from the recessed portion 240.

Accordingly, the exemplary utensil crock 300 includes the removable dividing panel 304 which is slidably received in the guide 350 on the inner surface of the receptacle sidewall 312. The dividing panel 304 includes the first panel part 336 and the second panel part 338 that is movable relative to the first panel part. This allows for different compartment configurations within the interior of the receptacle. For example, the dividing panel 304 can be placed in vertically with the first and second panel parts aligned, and alternatively can be placed in an L-shape with the second panel part extended outwardly (i.e., approximately perpendicular) from the first panel part such that the second panel part defines a bottom surface for one of the interior compartments. The dividing panel 304 is completely removable if the user wants to leave the receptacle fully open, and when the dividing panel is removed it can be snapped onto the base 310 of the receptacle 302.

It will be appreciated that the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A utensil crock, comprising:
a receptacle having a base and a sidewall defining an open upper end of the receptacle; and
a dividing panel adapted to be removably positioned within an interior of the receptacle to divide the interior into separate compartments, the dividing panel has a first end portion opposite a second end portion, wherein the dividing panel is configurable between a first configuration where the second end portion has a first orientation relative to the first end portion and a second configuration where the second end portion has a differing second orientation relative to the first end portion, and when positioned in the interior with the second end portion located closer to the base than the first end portion the dividing panel has one of the first configuration and the second configuration,
wherein an inner surface of the side wall includes a first channel and a second channel aligned with and facing the first channel, each of the first channel and the second channel extending vertically between the base and the open upper end,
where in the first configuration the first and second end portions are each received in the first and second channels,
where in the second configuration the first end portion is received in the first and second channels and the second end portion is extended outwardly from the first end portion toward the sidewall.

2. The utensil crock of claim 1, wherein the inner surface of the sidewall includes a first end opposite a second end, and a first side opposite a second side, each of the first side and the second side spanning between the first end and the second end, wherein the first side includes the first channel and the second side includes the second channel.

3. The utensil crock of claim 2, wherein the dividing panel has a first side portion opposite a second side portion, the first side portion and second side portion of the dividing panel are adapted to be inserted into the first channel and the second channel in both the first configuration and the second configuration.

4. The utensil crock of claim 2, wherein at least one of the first end and the second end of the sidewall is adapted to support the dividing panel in the second configuration.

5. The utensil crock of claim 4, wherein the second end portion of the dividing panel is supported on the one of the first end and the second end of the sidewall in the second configuration.

6. The utensil crock of claim 1, wherein the dividing panel includes a first panel part having the first end portion and a second panel part having the second end portion that is movable relative to the first panel part allowing the dividing panel to be positioned in one of the first configuration and the second configuration.

7. The utensil crock of claim 6, wherein the first panel part and second panel part are separate components of the dividing panel, the second panel part pivotally connected to the first panel part.

8. The utensil crock of claim 6, where in the second configuration the second panel part is approximately perpendicular to the first panel part and is vertically spaced and approximately parallel to the base, the second panel part defining a bottom surface for one of the separate compartments.

9. The utensil crock of claim 1, wherein the base is adapted to store the dividing panel when not in use within the receptacle.

10. The utensil crock of claim 9, wherein the base includes an outer recessed portion defined by a sidewall of the base, the sidewall of the base having an inner surface with engagement members adapted to secure the dividing panel within the recessed portion.

11. A utensil crock, comprising:
a receptacle having a base and a sidewall defining an open upper end of the receptacle, an inner surface of the sidewall includes a first channel and a second channel aligned with and facing the first channel; and
a dividing panel removably positioned within the first and second channels of the receptacle to separate an interior of the receptacle into compartments, the dividing panel includes a first panel part and a second panel part that is movable relative to the first panel part such that the dividing panel when positioned within the first and second channels with the second panel part located closer to the base than the first panel part is configurable between a first configuration where the first and second panel parts are vertically aligned and a second configuration where the second panel part is extended outwardly from the first panel part toward the sidewall and defines a bottom surface for one of the compartments.

12. The utensil crock of claim 11, wherein the inner surface of the sidewall is adapted to support the second panel part in the second configuration of the dividing panel.

13. The utensil crock of claim 11, wherein the first and second panel parts are separate components of the dividing panel, the second panel part pivotally connected to the first panel part.

14. The utensil crock of claim 11, wherein the base is adapted to store the dividing panel when not in use within the receptacle.

15. The utensil crock of claim 14, wherein the base includes an inner surface defining the interior of the receptacle and an outer surface opposite the inner surface relative to a thickness direction of the base, the outer surface together with a sidewall of the base defines an outer recessed portion sized to receive and store the dividing panel therein.

* * * * *